(12) United States Patent
Chen

(10) Patent No.: US 9,063,712 B2
(45) Date of Patent: Jun. 23, 2015

(54) LAPTOP COMPUTER COOLING STAND

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Qiang Chen, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 356 days.

(21) Appl. No.: 13/727,537

(22) Filed: Dec. 26, 2012

(65) Prior Publication Data

US 2014/0166234 A1    Jun. 19, 2014

(30) Foreign Application Priority Data

Dec. 18, 2012  (CN) .......................... 2012 1 0550757

(51) Int. Cl.
*G06F 1/20*  (2006.01)

(52) U.S. Cl.
CPC ....................................... *G06F 1/203* (2013.01)

(58) Field of Classification Search
CPC ...................................................... G06F 1/203
USPC ..................... 165/80.2, 80.3, 185; 248/346.1; 361/707
See application file for complete search history.

(56) References Cited

U.S. PATENT DOCUMENTS

| | | | |
|---|---|---|---|
| 5,552,960 A * | 9/1996 | Nelson et al. ............ | 361/679.54 |
| 6,256,193 B1 * | 7/2001 | Janik et al. ............... | 361/679.59 |
| 6,687,123 B2 * | 2/2004 | Kitahara ........................ | 361/695 |
| 6,826,047 B1 * | 11/2004 | Chen et al. ............... | 361/679.47 |
| 7,249,747 B2 * | 7/2007 | Marceau et al. .......... | 248/346.04 |
| 7,342,783 B2 * | 3/2008 | Park ......................... | 361/679.48 |
| 7,445,479 B2 * | 11/2008 | Fan et al. ...................... | 439/171 |
| 8,270,168 B2 * | 9/2012 | Lin et al. ........................ | 361/707 |
| 8,493,735 B2 * | 7/2013 | Iijima ........................... | 361/699 |
| 2002/0186531 A1 * | 12/2002 | Pokharna et al. ............. | 361/687 |
| 2004/0123604 A1 * | 7/2004 | Pokharna et al. ................ | 62/3.2 |
| 2004/0262485 A1 * | 12/2004 | Marceau et al. .......... | 248/346.01 |

* cited by examiner

*Primary Examiner* — Allen Flanigan
(74) *Attorney, Agent, or Firm* — Novak Druce Connolly Bove + Quigg LLP

(57) ABSTRACT

A laptop computer cooling stand includes a main body, a number of semiconductor chilling plates, a number of first heat sinks, and a number of second heat sinks. The main body includes a base and a cover. The base defines a receiving space. The cover covers the receiving space and defines a number of openings. The semiconductor chilling plates are set in the receiving space. The first heat sinks are set on the semiconductor chilling plates. The first heat sinks are exposed through the opening of the cover. The second heat sinks are attached to a bottom of the base. The second heat sinks make contact with heat-dissipating sides of the semiconductor chilling plates through the base. The first heat sinks make contact with heat-collecting sides of the semiconductor chilling plates.

8 Claims, 3 Drawing Sheets

LAPTOP COMPUTER COOLING STAND

BACKGROUND

1. Technical Field

The present disclosure relates to a laptop computer cooling stand.

2. Description of Related Art

Laptop computers generate a significant amount of heat during operation, particularly due to the compactness of the electronics. The bottom surface of these computers generates a large amount of heat when placed on a desk. Removal of the generated heat must take place quickly, to avoid damage to the computers.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

Figure 1:
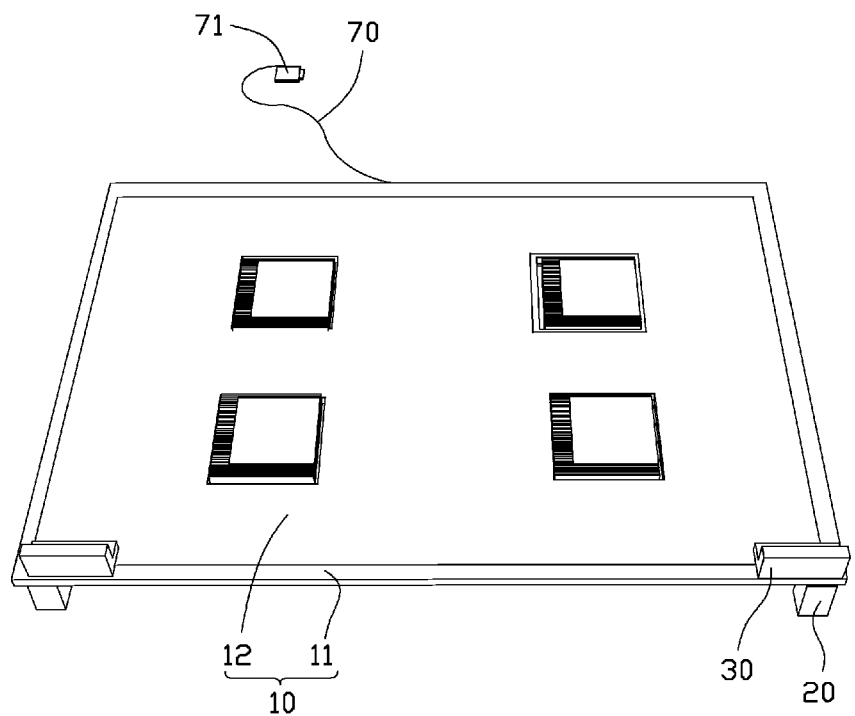
FIG. 1 is an assembled, isometric view of an exemplary embodiment of a laptop computer cooling stand.
Figure 2:
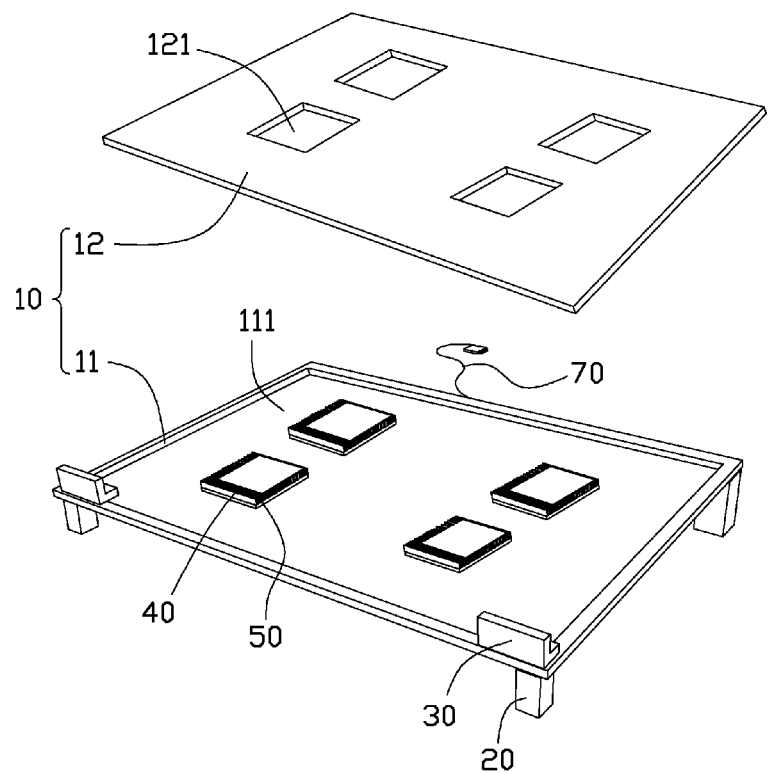
FIG. 2 is an exploded, isometric view of the laptop computer cooling stand of FIG. 1.
Figure 3:
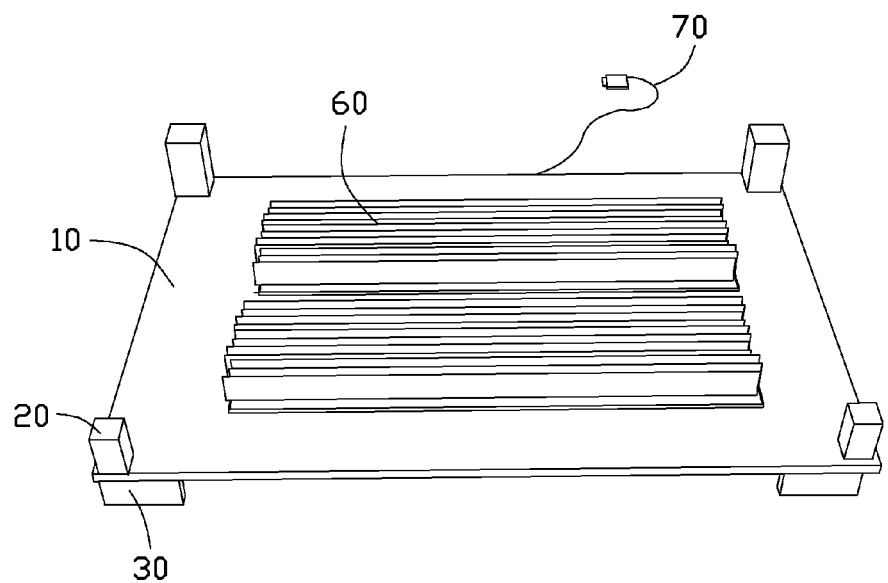
FIG. 3 is an inverted view of the laptop computer cooling stand of FIG. 1.

Referring to FIGS. 1 to 3, an exemplary embodiment of a laptop computer cooling stand includes a substantially rectangular main body 10, four supporting blocks 20, two L-shaped blocks 30, a plurality of first heat sinks 40, a plurality of semiconductor chilling plates 50, and a plurality of second heat sinks 60.

The main body 10 includes a substantially rectangular base 11 and a cover 12. A substantially rectangular receiving space 111 is defined in a top of the base 11. The semiconductor chilling plates 50 are set in the receiving space 111. Although supported by the cooling stand, the semiconductor chilling plates 50 can be electronically connected to a laptop computer through a cable 70 with a universal serial bus (USB) connector 71. The first heat sinks 40 are each set on a semiconductor chilling plate 50. The second heat sinks 60 are attached to a bottom of the base 11 and aligned with the semiconductor chilling plates 50. The second heat sinks 60 makes contact with heat-dissipating sides of the semiconductor chilling plates 50 through the base 11. The first heat sinks 40 makes contact with the heat-collecting sides of the semiconductor chilling plates 50. The cover 12 covers the receiving space 111. The cover 12 defines a plurality of openings 121 aligned with the first heat sinks 40. The first heat sinks 40 are exposed out of the openings 121 to make contact with a bottom of the laptop computer.

The four supporting blocks 20 are fixed to corners of the bottom of the base 11. The blocks 30 are fixed on one side of the top of the base 11. The two supporting blocks 20 adjacent to the blocks 30 are shorter than the other two of the supporting blocks 20.

In use, the laptop computer is supported on the main body 10, the blocks 30 block one side of the laptop computer. The heat generated by the laptop computer is transferred to the semiconductor chilling plates 50 through the first heat sinks 40. The heat collected by the semiconductor chilling plates 50 is dissipated by the base 11 and the second heat sinks 60.

In the embodiment, the base 11 is made of heat conductive materials, such as aluminium or aluminium alloy. The cover 12 is also made of heat conductive materials.

It is to be understood, however, that even though numerous characteristics and advantages of the embodiments have been set forth in the foregoing description, together with details of the structure and function of the embodiments, the present disclosure is illustrative only, and changes may be made in details, especially in the matters of shape, size, and arrangement of parts within the principles of the embodiments to the full extent indicated by the broad general meaning of the terms in which the appended claims are expressed.

What is claimed is:

1. A laptop computer cooling stand, comprising:
a main body comprising a base and a cover, wherein the base defines a receiving space in a top, the cover covers the receiving space and defines a plurality of openings;
a plurality of semiconductor chilling plates set in the receiving space;
a plurality of first heat sinks set on the semiconductor chilling plates, wherein the first heat sinks are exposed through the openings; and
a plurality of second heat sinks attached to a bottom of the base;
wherein the second heat sinks make contact with heat-dissipating sides of the semiconductor chilling plates through the base, the first heat sinks make contact with heat-collecting sides of the semiconductor chilling plates, opposite the heat-dissipating sides.

2. The laptop computer cooling stand of claim 1, wherein the base is substantially rectangular, four supporting blocks are fixed to four corners of the bottom of the base.

3. The laptop computer cooling stand of claim 2, wherein two substantially L-shaped blocks are fixed on one side of the top of the base.

4. The laptop computer cooling stand of claim 3, wherein two of the supporting blocks adjacent to the blocks are shorter than the other two of the supporting blocks.

5. The laptop computer cooling stand of claim 1, wherein a cable with a universal serial bus (USB) connector is electronically connected to the semiconductor chilling plates.

6. The laptop computer cooling stand of claim 1, wherein the base is made of heat conductive material.

7. The laptop computer cooling stand of claim 6, wherein the base is made of aluminium or aluminium alloy.

8. The laptop computer cooling stand of claim 1, wherein the cover is made of heat conductive material.

* * * * *